(12) United States Patent
Nyberg et al.

(10) Patent No.: US 7,707,412 B2
(45) Date of Patent: Apr. 27, 2010

(54) LINKED AUTHENTICATION PROTOCOLS

(75) Inventors: Kaisa Nyberg, Helsinki (FI); Valtteri Niemi, Helsinki (FI); Nadarajah Asokan, Espoo (FI)

(73) Assignee: Nokia Corporation, Espoo (FI)

( * ) Notice: Subject to any disclaimer, the term of this patent is extended or adjusted under 35 U.S.C. 154(b) by 975 days.

(21) Appl. No.: 10/528,161

(22) PCT Filed: Nov. 25, 2002

(86) PCT No.: PCT/IB02/05195

§ 371 (c)(1),
(2), (4) Date: May 16, 2005

(87) PCT Pub. No.: WO2004/028071

PCT Pub. Date: Apr. 1, 2004

(65) Prior Publication Data

US 2005/0210251 A1 Sep. 22, 2005

(30) Foreign Application Priority Data

Sep. 18, 2002 (GB) .................................. 0221674.5

(51) Int. Cl.
*H04L 9/32* (2006.01)
(52) U.S. Cl. ....................................................... 713/168
(58) Field of Classification Search ................. 713/168, 713/150; 380/247, 270
See application file for complete search history.

(56) References Cited

U.S. PATENT DOCUMENTS 6,760,444 B1 *  7/2004  Leung ......................... 380/270
7,231,521 B2 *  6/2007  Buddhikot et al. ........... 713/171
7,287,156 B2 * 10/2007  McGarvey .................. 713/153
7,350,076 B1 *  3/2008  Young et al. ................ 713/169
7,356,145 B2 *  4/2008  Ala-Laurila et al. ......... 380/247

(Continued)

FOREIGN PATENT DOCUMENTS

EP          1 209 934 A1       5/2002

(Continued)

OTHER PUBLICATIONS

Blunk et al., "Ppp Extensible Authentication Protocol (EAP)", RFC 2284, Mar. 1998.

(Continued)

*Primary Examiner*—Matthew B Smithers
*Assistant Examiner*—Ali S Abyaneh
(74) *Attorney, Agent, or Firm*—Mintz, Levin, Cohn, Ferris, Glovsky and Popeo, P.C.

(57) ABSTRACT

A system and method for authenticating a terminal in a communication system is described. The method includes executing a terminal authentication protocol, whereby the executing the terminal authentication protocol includes authenticating an identity of a network entity by a terminal in a communication system. The method further includes executing a challenge authentication protocol, wherein the executing the challenge authentication protocol includes sharing challenge data between the terminal and the network entity, and forming at the terminal, test data by at least applying one authentication function to the challenge data using the identifier. The executing the challenge authentication protocol further includes transmitting a message including terminal authentication data from the terminal to the network entity, and determining, based on the terminal authentication data, whether to provide the terminal with access to a service.

65 Claims, 5 Drawing Sheets

U.S. PATENT DOCUMENTS

2002/0129236 A1 9/2002 Nuutinen
2002/0154776 A1* 10/2002 Sowa et al. .......... 380/247
2004/0015692 A1* 1/2004 Green et al. .......... 713/169

FOREIGN PATENT DOCUMENTS

GB         2 366 938 A    3/2002
WO         WO 00/02406    1/2000

OTHER PUBLICATIONS

Zorn, "Microsoft Vendor-specific Radius Attributes", RFC 2548, Mar. 1999.

Buckley et al., "EAP SIM GMM Authentication", Internet Draft, <draft-buckley-pppext-eapsim-gmm-00.txt>, Aug. 2002.

Anderson et al., Protected EAP Protocol (PEAP), Internet Draft, <draft-josefsson-pppexteap-tis-eap-02.txt>, Feb. 23, 2002.

Sheffer at al., "PIC, A Pre-IKE Credential Provisioning Protocol", Internet Draft, <draft-ieffipsra-pic=05.txt>, Feb. 11, 2002.

Funk, "EAP Tunneled US Authentication Protcol (EAP-TTLS)", Internet Draft, <draft-ietfpppext-eap-ttls-01.txt>, Feb. 2002.

Bellovin et al., "Client Certificate and Key Retrieval for IKE", Internet Draft (work in progress), <draft-bellovin-ipsra-getcert-00.txt>, Jun. 2000.

* cited by examiner

Relationship between EAP client, backend authentication server and NAS in PEAP

EAP SIM GMM Authentication: Architecture Overview

The network architectural model for EAP-TTLS

Relations between the PIC entities

LINKED AUTHENTICATION PROTOCOLS

BACKGROUND OF THE INVENTION

1. Field of the Invention

This invention relates to authentication protocols.

2. Description of the Related Art

Authentication protocols are used in communication networks to enable one entity in the network to satisfy another entity of its capacity to be provided with a service, for example the undertaking of a data transaction or the granting of access to a resource. For example, if a user's mobile telephone is to access an e-mail account on a remote server then the server may wish to authenticate the mobile phone so that it can be sure that it is making the contents of the account available to the correct entity. Similarly, the user of the mobile phone may want the phone to authenticate the server so that he can be sure that data that he provides to the server is not being intercepted by a third party who might be impersonating the server.

A number of authentication protocols have been developed.

The Extensible Authentication Protocol (EAP), described in [RFC2284], provides a standard mechanism for support of multiple authentication methods. Through the use of EAP, support for a number of authentication schemes may be added, including smart cards, Kerberos, Public Key, One Time Passwords, and others. Specific EAP/SIM and EAP/AKA methods have been defined for the purposes of the OWLAN system, which makes use of the GSM or UMTS authentication methods for the authentication of WLAN access and derivation of link keys for the protection of the WLAN link.

EAP is a general authentication protocol, designed to allow end-points to use multiple forms of authentication. EAP does not require the server (typically a PPP or IEEE 802 end-point) to authenticate the client itself, rather it allows the server to proxy authentication messages to a back-end authentication server, and inspect the packets to determine if the authentication was successful.

One of the goals of EAP is to enable the development of new authentication methods without requiring the deployment of new code on the local authentication server. As a result, the local server acts as a "passthrough", and need not understand specific EAP methods.

Since its deployment, a number of weaknesses in EAP have become apparent. These include lack of protection of the user identity or the EAP negotiation and no standardized mechanism for key exchange. For example, EAP/SIM and EAP/AKA solve these problems by making use of the specific features of SIM and USIM (AKA) authentication methods.

Recently IETF working groups have designed three new protocols to develop standard solutions. Two of them PEAP and TTLS, originating from the pppext working group, are intended to solve the same problem as EAP/SIM and EAP/AKA, but independently of the specific EAP method. The idea in brief is to encapsulate the EAP protocol within TLS. The third protocol PIC is developed by the ipsra working group, and it develops a unilateral version of the ISAKMP authentication and key derivation protocol, within which the EAP protocol is encapsulated. All three protocols include a method of managing secret parameters for further use. In PEAP and TTLS keys are derived from the TLS master key, while in PIC the tunnel derived by simplified ISAKMP is used to transport security association from the local authentication server to the client.

By wrapping the EAP protocol within TLS, Protected EAP (PEAP) claims to provide user anonymity and built-in support for key exchange.

FIG. 1 shows the relationship between the EAP peer (client), the network authentication server (NAS) and the back-end authentication server. As described in the figure, the EAP conversation "passes through" the NAS on its way between the client and the backend authentication server. While the authentication conversation is between the EAP peer and the backend authentication server, the NAS and the backend authentication server need to have established trust for the conversation to proceed.

In PEAP, the conversation between the EAP peer and the backend server is encrypted and integrity protected within a TLS channel, and mutual authentication is required between the EAP peer and the backend server.

As a result, the NAS does not have knowledge of the TLS master secret derived between the EAP Peer and the backend authentication server, and cannot decrypt the PEAP conversation. In order to providing keying material for link-layer ciphersuites however, the NAS does obtain the master session keys, which are derived from the TLS master secret via a one-way function.

Since EAP methods may not know the link layer ciphersuite that has been negotiated, it may not be possible for them to provide link layer ciphersuite-specific keys. In addition, attempting to provide such keys is undesirable, since it would require the EAP method to be revised each time a new link layer ciphersuite is developed. As a result, PEAP derives master session keys, which can subsequently be truncated for use with a particular link layer ciphersuite. PEAP does not discuss the format of the attributes used to communicate the master session keys from the backend authentication server to the NAS; examples of such attributes are provided in [RFC2548].

The operation of PEAP is as follows:

1. Establish TLS connection. The TLS record protocol provides a secure connection between the peer and the back-end authentication server 2. Authenticate TLS server. The TLS handshake protocol is used for server authentication 3. Authenticate user. The user of the peer authenticates by tunnelling another EAP mechanism (e.g. Generic Token Card) inside the EAP-TLS connection. The back-end authentication server may have to contact another server to get the user authentication information validated.

4. Generate session keys. Using the TLS Pseudo-Random Function (PRF), the peer and the back-end server generate key material for use between NAS and peer.

5. (Transport session keys). The session key is transported from the server to the authenticator using e.g. Radius attributes and secure connection.

In a new internet draft, draft-buckley-pppext-eap-sim-gmm-00.txt, an application of PEAP to GSM authentication is presented. The architectural overview of this EAP method using SIM is depicted in FIG. 2.

The architectural view of EAP-TTLS is essentially the same as in PEAP, see FIG. 3. EAP-TTLS claims to allow legacy password-based authentication protocols to be used against existing authentication databases, while protecting the security of these legacy protocols against eavesdropping, man-in-the-middle and other cryptographic attacks.

EAP-TTLS also allows the client and server to establish keying material for use in the data connection between the client and access point. The keying material is established implicitly between the client and server based on the TLS handshake.

When record layer security is instantiated at the end of a TLS handshake, a pseudo-random function (PRF) is used to expand the negotiated master secret, server random value and client random value into a sequence of octets that is used as keying material for the record layer.

EAP-TTLS leverages this technique to create keying material for use in the data connection between client and access point. Exactly the same PRF is used to generate as much keying material as required, with the constant string set to "ttls keying material", as follows:

EAP-TTLS_keying_material=PRF(SecurityParameters. master_secret, ttls keying material", SecurityParameters.client_random+SecurityParameters.server_random);

The master secret, client random and server random used to generate the data connection keying material must be those established during the TLS handshake. Both client and TTLS server generate this keying material, and they are guaranteed to be the same if the handshake succeeded. The TTLS server distributes this keying material to the access point via the AAA carrier protocol.

The PIC protocol is a method to bootstrap IPsec authentication via an "Authentication Server" (AS) and user authentication mechanisms (e.g., RADIUS), see FIG. 4. The client machine communicates with the AS using a key exchange protocol where only the server is authenticated, and the derived keys are used to protect the user authentication. Once the user is authenticated, the client machine obtains credentials from the AS that can be later used to authenticate the client in a standard IKE exchange with an IPsec-enabled security gateway. The later stage does not require user intervention.

The PIC protocol realizes this approach and secures it using simplified ISAKMP and IKE mechanisms. The protocol embeds EAP messages [RFC2284] in ISAKMP payloads to support multiple forms of user authentication. Once this user authentication succeeds, the client machine obtains from the AS credentials that can later be used by the client to perform regular IKE authentication with an IPsec-enabled gateway. PIC defines several forms of credentials and can be extended to support others. Note that this document uses the term "credentials" for both digital certificates and shared secret keys.

PIC requires no modification to IKE. Instead it uses simplified elements of ISAKMP and IKE to obtain a much less ambitious goal than general IKE, namely the secure provisioning of credentials for successfully authenticated users. The direct use of IKE, e.g. as compared to TLS tunneling [GETCERT], reduces complexity and contributes to the efficiency of the protocol.

The PIC protocol is defined between the Client and the AS. All other exchanges between the entities are implicit in the protocol. This applies in particular to user and machine authentication between the AS and the Back-End Authentication Server, and certification between the AS and the CA.

The four main stages of the proposed PIC protocol are:

1. An optional round of messages provides partial protection of the AS from denial-of-service attacks by verifying that the initiator of the exchange is reachable at the purported source IP address. This is done before any significant CPU or memory resources are consumed by the AS.

2. The protocol establishes a one-way authenticated channel from the client to the AS in which only the server is authenticated.

3. User authentication is performed over this secured channel. User authentication information is transported using EAP tunnelled within ISAKMP.

4. The AS sends the client a (typically short-term) credential, which can be used in subsequent IKE exchanges. This credential can be thought of as a certificate, or a private key generated or stored by the AS and accompanied by a corresponding certificate. It may also be a symmetric secret key, or other information for deriving such a key.

In stage 4 the created ISAKMP tunnel is used to obtain the secure provisioning of credentials for successfully authenticated users.

Another alternative proposal is HTTP digest authentication within a TLS tunnel, which is not described in detail here.

It should be noted that the network entity called "back-end server" in the description of PEAP, see FIG. 1, has not at all the same role in the authentication protocol as the back-end server in PIC has. The PEAP back-end server is called the EAP Server in FIG. 2 and its role is essentially the same as that of the TTLS AAA server of EAP-TTLS (FIG. 3) and the AS of PIC (FIG. 4).

The above proposals all utilise an inner client (or mutual) authentication protocol within a secure tunnel constructed using a session key resulting from an outer server authentication protocol. In the following description we use EAP/AKA as an example of the inner protocol. But the general points of the discussion are applicable to any pair of authentication protocols used in the above manner. This is convenient because the EAP/AKA protocol is to be implemented by the USIM of 3G mobile stations, and so this protocol is readily available to a terminal that is to be authenticated. EAP/AKA is a challenge-response protocol. In the protocol the "responding entity" which is to be authenticated shares a secret key with the "challenging entity" which is to verify its authenticity. The challenging entity issues to the responding entity a challenge message which includes challenge data, which is typically randomly generated data. The responding entity then generates response data by applying a known function to that challenge data and to the secret key. The response data is returned to the challenging entity in a response message. The challenging entity can also apply the known function to the challenge data and the key, and the result of that can be compared to the response data. Only if the two match is the responding entity is authenticated. In the above proposals the authentication method of AKA is to be used in just the same way as in its pre-existing applications: i.e. the terminal is supplied with challenge data to which it is to apply the function, and then it returns the result to the network for authentication. However, the key agreement part of UMTS AKA is not used.

In place of the EAP encapsulated AKA protocol any EAP type protocol can be used for authentication of the terminal to network.

FIG. 5 illustrates the logical architecture that is common to all of the above proposals. First, a stage-one authentication exchange 40 takes place. In that exchange the identity of a back-end server 41 is authenticated to a terminal entity 42. However, the identity of the terminal entity is not authenticated to the back-end server. Then a stage-two authentication exchange 43 takes place, in which it is intended that the terminal entity is authenticated to the back-end server. Since each of the proposals is intended to be compatible with existing terminal entities, the existing authentication protocol (e.g. EAP/AKA), which has hitherto been usable as a stand-alone protocol, is used for the essential authentication part of stage two. In stage two the back-end server issues a challenge 44 to the terminal entity. The challenge is of such a type that the back-end server can (either by itself or through referral to a further authentication server) authenticate the terminal by means of its response to the challenge. The terminal entity processes the challenge and formulates its response (step 45) and returns that response to the back-end server (step 46). Then the back-end server checks the response (or refers it for checking) (step 47). If the response is correct then the back-end server has authenticated the terminal entity and can issue it with credentials, e.g. session keys that allow it to carry out subsequent secure transactions with the server (step 48). Otherwise no such credentials are issued and the terminal entity cannot carry out such transactions.

Some of the stage-two protocols have both authentication function and key-agreement function. In existing proposals the key-agreement function of the stage-two protocol is not used. Instead, the session keys are derived using the key-agreement function of the stage-one authentication protocol.

Up to now it has been supposed that the above proposals provide for secure authentication of both the back-end server and the terminal entity to each other. However, the inventors of the present invention have observed that this is not the case.

The vulnerability of the above proposals will be described with reference to FIG. 6. In FIG. 6 like items are numbered as for FIG. 5. In FIG. 6 a "man-in-the-middle" (MITM) attacker 49, who intends to impersonate a terminal entity 42, takes the place of the terminal entity in FIG. 5. The MITM performs the stage-one authentication with the back-end server. Then during the stage-two authentication when it receives the challenge message (step 44) from the back-end server it forwards it on to the terminal entity 42. (Step 50) Using the pre-existing AKA protocol, it returns the appropriate response to the MITM. (Step 51). Then the MITM forwards that response to the back-end server. (step 46). Since the response is the correct response for authentication of terminal entity 42 the back-end server will authenticate the MITM as terminal entity 42 (step 47) and issue it with credentials accordingly (step 48). That may allow the MITM access to supposedly secure services, impersonating the identity of terminal entity 42.

The proposals described above have been developed with the aim of using the existing challenge-response protocol for the essential authentication part of stage two, since that is already a feature of the terminals that are to use the system. Since the proposals fail to provide adequate security, a new approach is needed.

SUMMARY OF THE INVENTION

According to a first aspect of the present invention there is provided a method for authenticating a terminal in a communication system, the terminal comprising identification means for applying authentication functions to input data to form response data, and the communication system being arranged to utilise a first authentication protocol for authentication of the terminal, wherein an authentication functionality and the terminal share challenge data, the terminal forms response data and a first key by applying the authentication functions to the challenge data by means of the identification means, and returns the response data to the authentication functionality, and the authentication functionality authenticates the terminal by means of the response data and can apply an authentication function to the challenge data to duplicate the first key; the method comprising; executing a second authentication protocol wherein the terminal authenticates the identity of a network entity and the terminal and the network entity share a second key for use in securing subsequent communications between the terminal and the network entity; and subsequently executing a third authentication protocol by the steps of: sharing challenge data between the network entity and the terminal; forming at the terminal a test data by at least applying one of the authentication functions to the challenge data by means of the identification means; transmitting a message comprising terminal authentication data, from the terminal to the network entity; and determining based on the terminal authentication data whether to provide the terminal with access to a service; wherein in the determining step the terminal is provided with access to the service only if the terminal authentication data equals a predetermined function of at least the test data and the second key.

According to a second aspect of the present invention there is provided a communication system comprising identification means for applying authentication functions to input data to form response data, and the communication system being arranged to utilise a first authentication protocol for authentication of the terminal, wherein an authentication functionality and the terminal share challenge data, the terminal forms response data and a first key by applying the authentication functions to the challenge data by means of the identification means, and returns the response data to the authentication functionality, and the authentication functionality authenticates the terminal by means of the response data and can apply an authentication function to the challenge data to duplicate the first key; the system being arranged to perform an authentication method comprising the steps of: executing a second authentication protocol wherein the terminal authenticates the identity of a network entity and the terminal and the network entity share a second key for use in securing subsequent communications between the terminal and the network entity; and subsequently executing a third authentication protocol by the steps of: sharing challenge data between the network entity and the terminal; forming at the terminal test data by at least applying one of the authentication functions to the challenge data by means of the identification means; transmitting a message comprising terminal authentication data, from the terminal to the network entity; and determining based on the terminal authentication data whether to provide the terminal with access to a service; wherein in the determining step the terminal is provided with access to the service only if the terminal authentication data equals a predetermined function of at least the test data and the second key.

The predetermined function preferably takes as its inputs at least test data, the key, and optionally some other secret or public data (text) known to the terminal and the network entity.

The predetermined function may be used in a dedicated authentication step. In that case the said message may be a dedicated authentication message. Alternatively, or in addition, the predetermined function may be used for derivation of a session key to be used for encryption and/or authentication of communications between the terminal and the network entity. In that situation access to a service that makes use of that additional data may inherently be denied if the encryption and/or authentication key equals a predetermined function of the first key and the second key since the network entity may be unable to decrypt and/or verify the authenticity of the additional data.

Preferably there are steps of forming the test data by applying the authentication function to the challenge data at the authentication functionality; and transmitting the test data from the authentication functionality to the network entity. Preferably the determining step comprises forming network authentication data by applying the predetermined function at least to the test data and the key at the network entity. Preferably in the determining step the terminal is provided with access to the service only if the terminal authentication data formed at the terminal equals the network authentication data at the network entity.

Preferably there are steps of transmitting the key from the network entity to the authentication functionality; forming test data by applying the authentication function to the challenge data at the authentication functionality; and forming network authentication data by applying the predetermined function to at least the test data and the key at the authentication functionality.

Preferably there are steps of transmitting the terminal authentication data from the network entity to the authentication functionality; transmitting from the authentication functionality to the network entity an indication of whether the terminal authentication data equals the network authentication data. Preferably in the determining step the terminal is provided with access to the service only if the indication is that the terminal authentication data equals the network authentication data.

Preferably the method comprises transmitting the network authentication data from the authentication functionality to the network entity. Preferably in the determining step the terminal is provided with access to the service only if the indication is that the terminal authentication data equals the network authentication data.

Preferably the terminal authentication data and/or the network authentication data is/are formed as a cryptographic checksum.

In each case the terminal, and preferably several terminals operating in the system, is/are configured to form the terminal authentication data by: forming an intermediate value by applying the authentication function to the challenge data by means of the identification means, and forming the terminal authentication data by applying the predetermined function to the intermediate value and the key as shared with the network entity to which it returns the response message. Whether nested functions are evaluated at the terminal or the authentication functionality, it will be appreciated that the formation of an intermediate or test value may be conceptual, since the nested functions may be evaluated as a single, combined function.

The authentication means may be an identity module of the terminal, or it could be implemented as part of the general processing functionality of the terminal, for example on a general-purpose ASIC of the terminal. The identity module may be user-removable from the terminal. The identity module may be a SIM or a USIM. The first authentication protocol may be the AKA protocol. The first authentication protocol may be used by the system for authenticating a terminal for the purpose of granting or denying it access to the system. In that way, the protocol is likely to be widely or universally supported by terminals operating in the system.

The test data and/or the intermediate value may include one or both of the AKA IK value or the AKA CK value.

Preferably the authentication means stores a code and the authentication function comprises applying a cryptographic transformation to the code and the input data. That code is preferably stored securely by the authentication means and the authentication function.

The network entity and/or the authentication functionality may be co-located with the back-end server.

When the first and second protocols are operated in accordance with the invention the first protocol may be used as a stage-one protocol and the second protocol as a stage-two protocol. The test data may be termed a key, in which case it may conveniently be referred to as a first key to distinguish it from the other (second) key mentioned above.

Any one or more of the forms of data referred to above may take one of the following forms, as identified in detail in the description below:
challenge data: K, RAND;
response data: RES;
first key: K, IK;
second key: T;
authentication data: V.

BRIEF DESCRIPTION OF THE DRAWINGS

The present invention will now be described by way of example with reference to the accompanying drawings.

In the drawings.

DETAILED DESCRIPTION OF THE PREFERRED EMBODIMENTS

In the examples to be described below authentication between two entities is performed in two stages. In stage one a protocol is used to authenticate a back-end server to a terminal entity. In stage two another protocol is used to authenticate the terminal entity to the back-end server. To address the man-in-the-middle attack discussed above, a link is made between the two protocols with the aim that the entity that authenticated the back-end server in stage one is the same as the entity authenticated by the back-end server in stage two.

Figure 1:
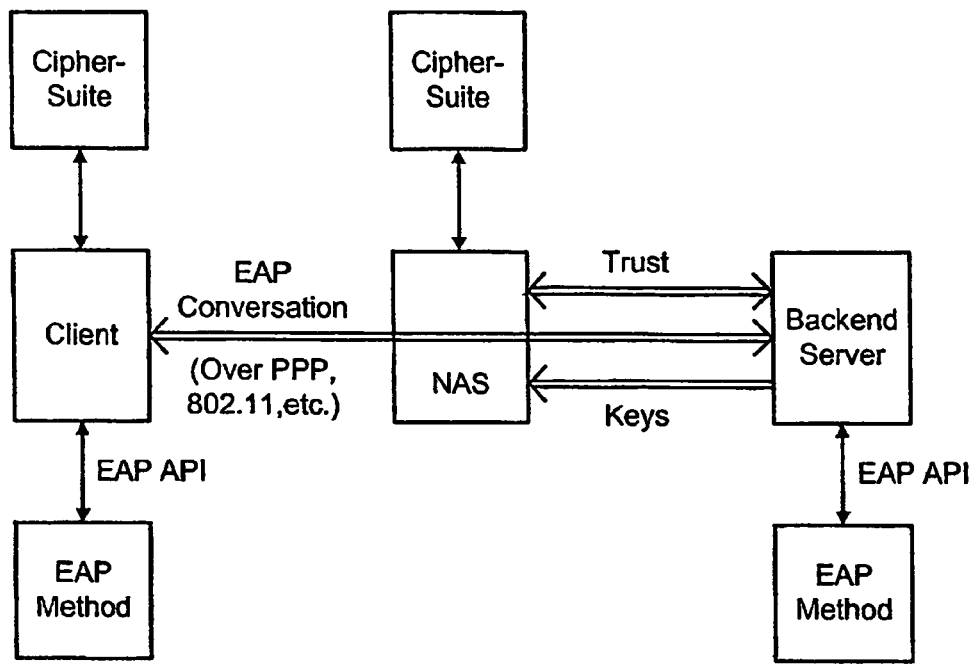
FIG. 1 shows the relationship between EAP client, backend authentication server and NAS in PEAP.
Figure 2:
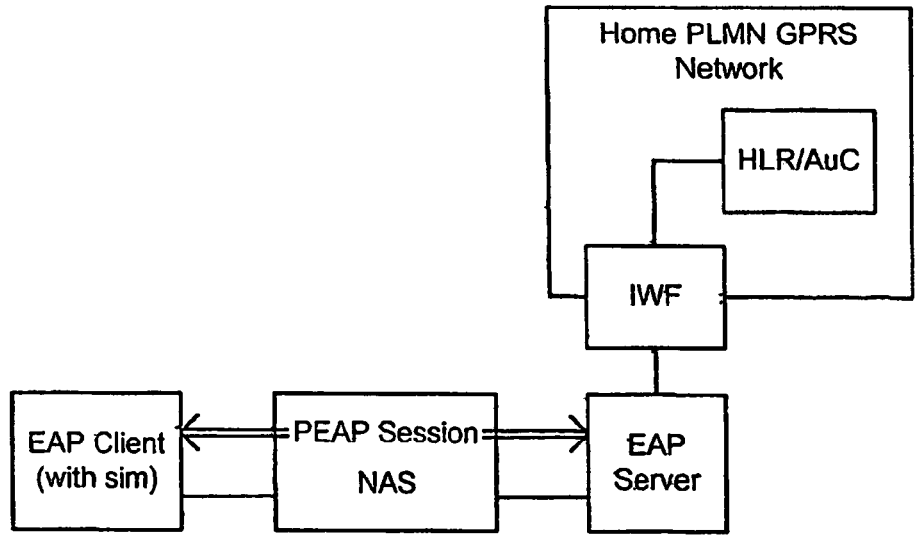
FIG. 2 shows an architecture overview of EAP SIM GMM authentication.
Figure 3:
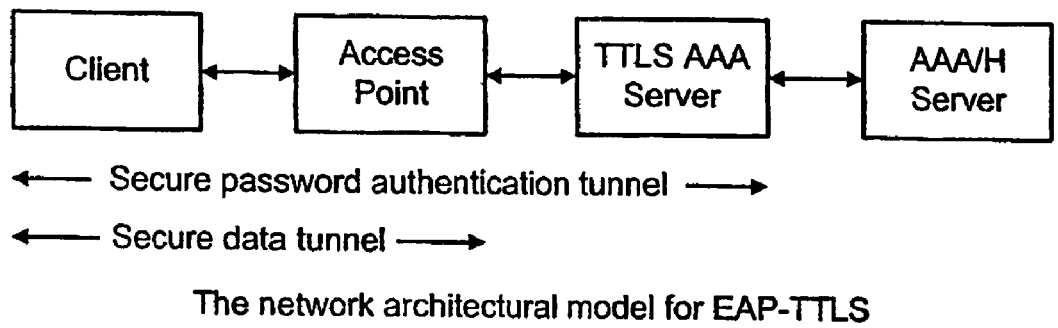
FIG. 3 shows the network architectural model for EAP-TTLS.
Figure 4:
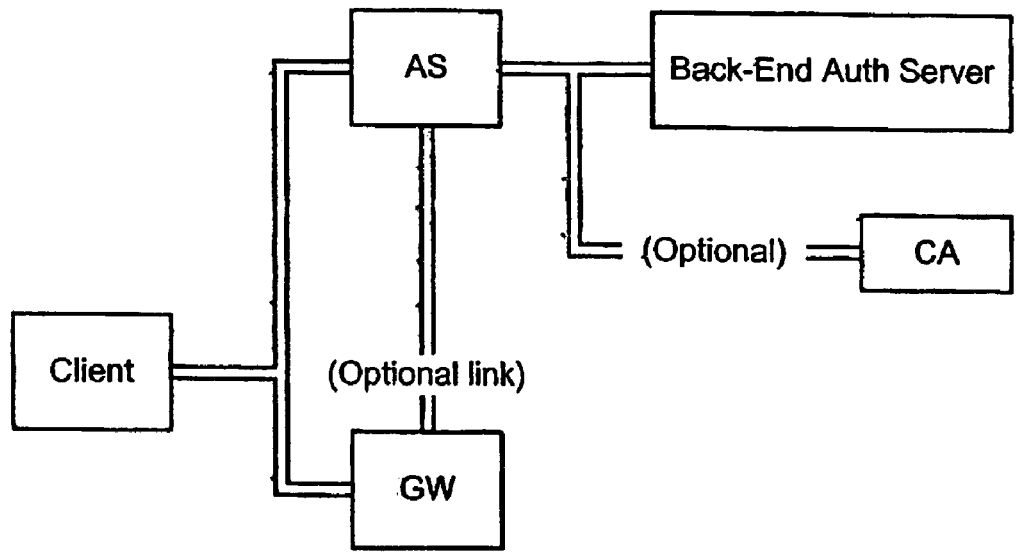
FIG. 4 shows relations between PIC entities.
Figure 5:
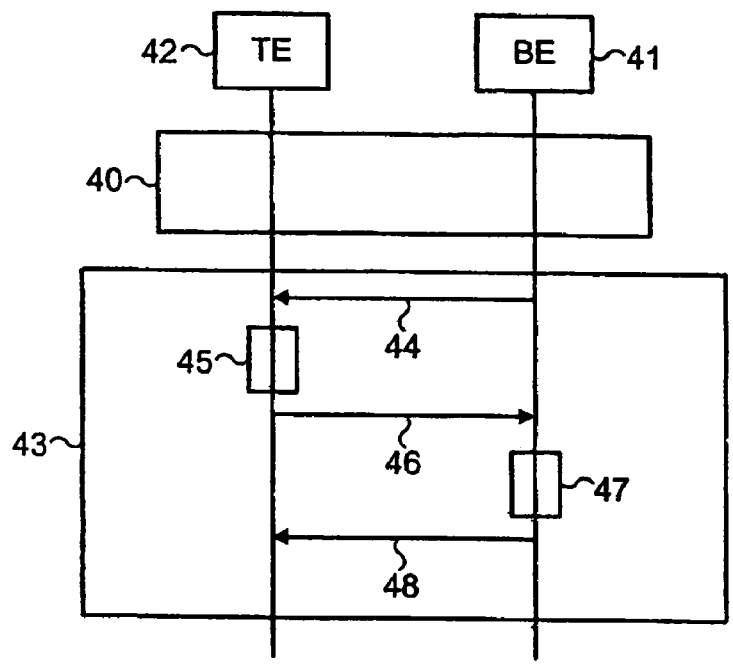
FIG. 5 shows the logical operation of proposed authentication protocols.
Figure 6:
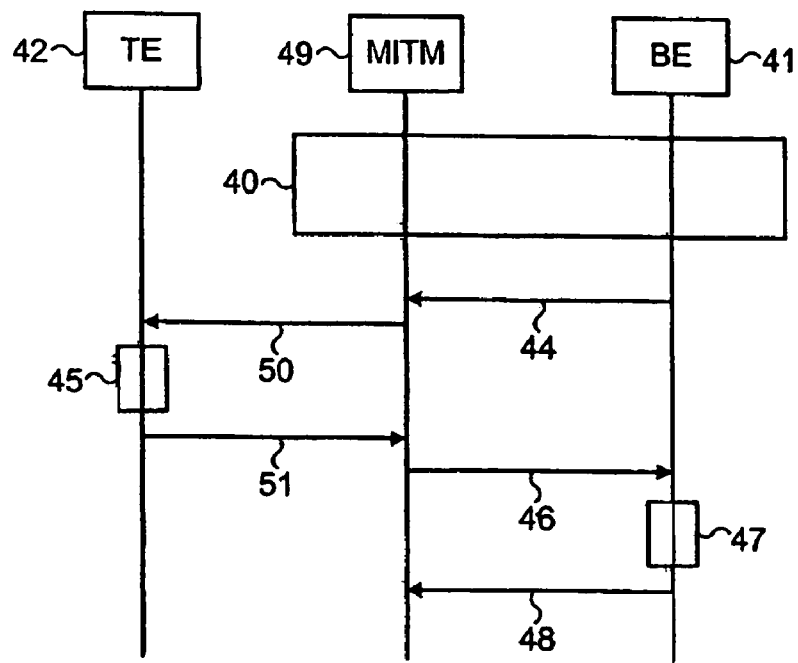
FIG. 6 illustrates a man-in-the-middle attack.
Figure 7:
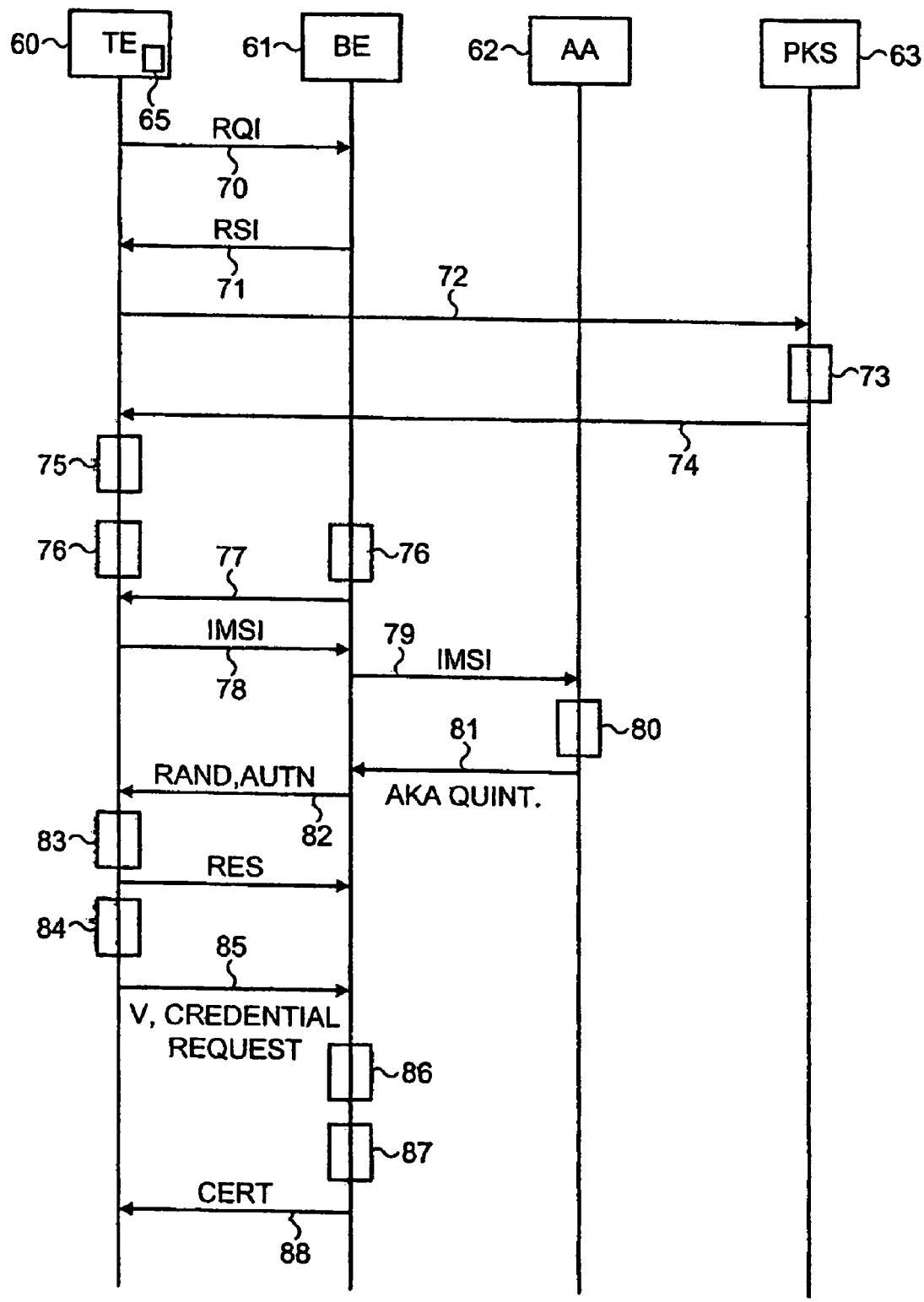
FIG. 7 shows an authentication protocol.
Figure 8:
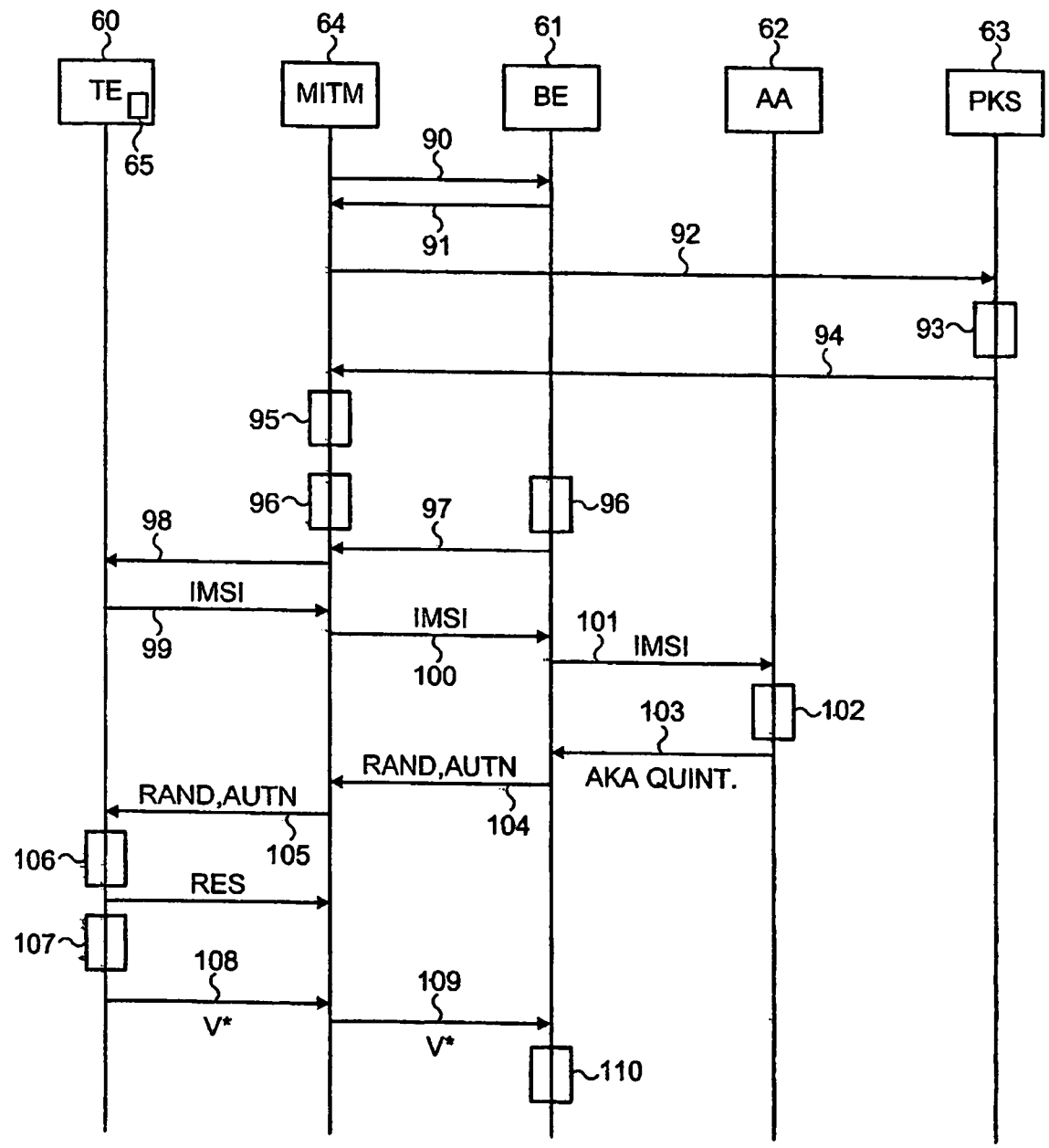
FIG. 8 illustrates a frustrated man-in-the-middle attack.

The authentication system will be described in more detail with reference to FIGS. 7 and 8. FIG. 7 shows the operation of the system for proper authentication of a terminal entity. FIG. 8 shows the operation of the system in frustrating a man-in-the-middle attack. It will be appreciated that these are merely examples and that the present invention is applicable to any generic combination of protocols that satisfy the requirements mentioned above: preferably that the stage-two protocol is used in other contexts too, the stage-one protocol does only server authentication, and both protocols result in session keys.

The entities shown in FIG. 7 are a terminal entity 60 (e.g. a 3G UE), a back-end server 61, an AKA authenticator 62 (e.g. a RAS or HSS) and a public key server 63.

The terminal entity is a GSM or 3G terminal incorporating a subscriber identity module (SIM or USIM), which implements the AKA protocol or another like protocol.

The terminal entity can also be a data terminal or any other end user device with network connectivity. According to this protocol the SIM or USIM securely stores a secret key K and when supplied with certain data D by the terminal can apply a two standard functions f and g to that data and the key to return two values, known as CK and IK. Thus:

$CK=f(K,D)$ and $IK=g(K,D)$

To maintain the security of the key the standard function is chosen so that it is very difficult to work out the key from the values that are returned.

The back-end server is a server that is expected to provide the terminal with access to some transaction that calls for authentication. This could, for example, be access to money or confidential data such as e-mails.

The AKA authenticator stores the secret keys of a number of subscribers, each in association with an identification of subscriber information relating to the SIM that stores the respective key. The AKA authenticator also knows functions f and g, so it can also calculate CK and IK for a given key and a given value of D.

In FIG. 7 the following steps take place:

Step 70 The terminal initiates stage-one authentication by transmitting a stage-one request message (RQ1) to the back-end server.

Step 71 The back-end server returns a stage-one response message (RS1) which might indicate its public key and one or more certificates. The actual form of this message depends on the protocol used.

Step 72 The terminal transmits data to the public key server 63 to verify the identity of the back-end server. This may involve requesting a revocation list from the public key server 63, or requesting an on-line status check by supplying the serial number of a certificate received in step 71.

Step 73 The public key server performs the appropriate check based on the data supplied in step 72, for instance by looking up the serial number received from the terminal in its database to determine the entity with which it is associated.

Step 74 The public key server returns the appropriate requested information to the terminal.

Step 75 The terminal verifies that the entity indicated in the message at step 74 is the one with which it intends to communicate, using the information received from the public key server. If so, it begins a secure communication session with the back-end server using the public key. Otherwise, it terminates the process.

Step 76 If the back-end server has been authenticated the back-end server and the terminal share the knowledge of a session key T. This is typically generated by both parties independently, from the authentication keys of the network entity and from the data exchanged in the protocol Step 77 The back-end server initiates stage-two authentication by transmitting an EAP—Request/Identity message to the terminal.

At this stage, the back-end server is authenticated to the terminal, and the back-end server and the terminal share session key T. In this example the session key is a PIC SA (security association) key, and subsequent messaging is done using the PIC protocol, secured using that key. However, other protocols could be used.

Step 78 The terminal transmits to the back-end server its identity (IMSI) by means of an EAP—Response/Identity message encapsulated by PIC.

Step 79 The back-end server sends the terminal's identity to the AKA authenticator 62. For this step a MAP (Send_Auth_Params: IMSI) message or a DIAMETER message could be used.

Step 80 The AKA authenticator looks up the secret key K it stores for the terminal, generates a random number RAND and applies the standard functions f and g to determine CK=f(RAND,K) and IK=g(RAND,K).

Step 81 The AKA authenticator transmits to the back-end server the usual AKA quintuplet comprising RAND, AUTN, RES, CK and IK. This may be sent as a MAP (AKA authentication quintuplet) message.

Step 82 The back-end server transmits a challenge message including RAND and AUTN to the terminal. AUTN is supplied so as to authorise the terminal to carry out the operation at step 83. This message may be transmitted as an EAP—Request/AKA-challenge (RAND, AUTN) message encapsulated by PIC.

Step 83 The terminal applies the received RAND to its SIM or USIM 65, which returns the corresponding RES, CK and IK.

Subsequently the terminal returns the value RES to the back-end server. This message may be transmitted as an EAP—Response/AKA-challenge (RES) message encapsulated by PIC.

This completes stage two. Now a third protocol is applied as follows.

Step 84 The terminal applies a further standard function h, which is known to the back-end server, to the IK (test data) returned by the SIM and the session key T (second key) obtained during the stage-one authentication, to generate a checksum (or result) value V:

K=h(IK, T, text), V=MAC(K, CREDENTIAL-REQUEST)

Thus a new key K (common to all the present methods) and then a checksum V are calculated. MAC is a message authentication code: suitable algorithm is e.g., HMAC_SHA1.

The function h is chosen so that it is infeasible to compute K without the knowledge of both IK and T. An example of function h is: SHA-1, or IMAC-SHA-1 with key IK and a data field comprising of T and text. The data text may be any session related data known to the terminal and to the back-end server. Steps 84 to 87 are mandated as an integral part of the protocol, with the result that the terminal has to perform them as laid down in the protocol. For example, suitable steps can be added as mandatory steps to PIC, PEAP and other similar protocols to make them secure.

Step 85 The terminal transmits a CREDENTIAL-REQUEST which is a field in the PIC message and a checksum V, which may also be transmitted as a field in the PIC message.

Step 86 The back-end server, which also has knowledge of function h, as well as the keys IK, received from the AKA authenticator functionality (AA authenticating server), and T established with the terminal at stage one, computes:

K'=h(IK, T,text), V'=MAC(K', CREDENTIAL-REQUEST)

using the value of IK supplied to it by the AKA authenticator.

Step 87 The back-end server compares the value of RES returned by the terminal with the value of XRES it has received from AA (this comparison of RES is standard part of the AKA protocol). The back-end server also compares V with the value V' it has calculated itself. If and only if the two match then the CREDENTIAL-REQUEST allegedly sent by the terminal is deemed to be authenticated to the back-end server. The value of V returned by the terminal serves in this embodiment as terminal authentication data, and the value of V' calculated by the AA serves in this embodiment as network authentication data. The network authentication data is compares with the terminal authentication data and if the two data are consistent in a predetermined manner, then the terminal is authenticated.

Step 88 If the terminal is authenticated to the back-end server then the back-end server transmits a security credential CERT to the terminal. Using that credential the terminal may then perform a secure transaction with the back-end server. This message may be transmitted as a field in a PIC message.

It is to be noted that in this system the value that is returned by the terminal to the back-end server as the result (85) in the third protocol is dependent on the session key (second key)

shared between the terminal and the back-end server in stage one (76) and the test data IK (83).

The procedure described above is an example of Method 2 to be described later.

FIG. 8 shows what happens in this system if a man-in-the-middle attack is attempted. In FIG. 8 the terminal entity 60, back-end server 61, AKA authenticator 62 and public key authenticator 63 are as for FIG. 7. In addition, FIG. 8 shows an MITM 64 who is attempting to assume the identity of terminal 60.

In FIG. 8 steps 90 to 97 are the same as steps 70 to 77 respectively in FIG. 7, but with the MITM 64 taking the place of terminal 60.

Then the following steps take place as the attack proceeds:

Step 98 The MITM passes the request for the IMSI on to the terminal 60.

Step 99 The terminal returns its IMSI to the MITM.

Step 100 The MITM passes the IMSI on to the back-end server.

Step 101 The back-end server passes the IMSI on to the AKA authenticator.

Step 102 The AKA authenticator determines an AKA quintuplet for the supplied IMSI.

Step 103 The AKA authenticator passes the AKA quintuplet to the back-end server.

Step 104 The back-end server passes RAND and AUTN to the MITM.

Step 105 The MITM passes RAND and AUTN to the terminal 60.

Step 106 The terminal determines RES and IK for the supplied RAND.

Step 107 If it the MITM has not established a shared key with the terminal 60 then the process will fail at this point because the terminal has no value of T to supply to function h. Alternatively, if the MITM has established a shared key (T*) then the terminal 60 can calculate:

K*=h(IK, T*,text*), V*=MAC(K*, CREDENTLAL-REQUEST)

However, this key T* and text* will be different from the key T and text that is shared by the MITM and the back-end server. Moreover, the victim will compute V* using its own CREDENTIAL-REQUEST. So the MITM will still not be able to gain access (see below) because the goal of MITM is to send his own CREDENTIAL-REQUEST* to the back-end server and pretend that it came from the client. Since the MITM does not know IK, he cannot compute K and hence he cannot compute a valid checksum V for a different CREDENTIAL-REQUEST. The exact form of T and the text and their contents should suitably be specified for each stage one protocol separately bearing in mind that it should be impossible to force the terminal to a predetermined T. This is typically easy to achieve. Moreover, the text field can be defined in such a way that it K and K* are necessarily different.

Step 108 If the process has not already failed, the terminal 60 passes V* to the MITM.

Step 109 The MITM passes V* to the back-end server. In addition, the MITM also forwards the CREDENTIAL-REQUEST* which is a field in the PIC message.

Step 110 The back-end server computes K'=h(IK,T,text) using the value of IK supplied to it by the AKA authenticator. Further, the back-end server computes the checksum V'=MAC(K',CREDENTIAL-REQUEST*) using the CREDENTIAL-REQUEST* sent by the MITM.

Step 111 Because of the definition of T and the text field, and since h is a cryptographically secure function it is very unlikely that K* will equal K'. Therefore, the checksums V' and V* will be different, and the MITM is not given access to the service.

Thus the previously-discussed man-in-the-middle attack is prevented.

The location at which some of the processes are performed could be different from that described above. Some examples are given in methods 1 to 3 below.

The back-end server could securely supply the credential to another unit with which the terminal could then conduct a secured transaction. In that case the back-end server could simply act as a terminal authentication server. The back-end server and the AKA authenticator or other authentication functionality could be integrated into one unit.

The present invention is not limited to operation with any specific type of communication system. However, the system is preferably a mobile communication system such as GSM or the third-generation (3G) system. Instead of the AKA protocol another authentication protocol supported by the terminal could be used. This is preferably the protocol used for granting or denying a terminal access to the network. The terminal is preferably capable of wireless (e.g. radio) communication with the back-end server (network entity) and the authentication server. The terminal may be a mobile station of the communication system.

The invention provides several different methods to provide authentication of the entity that holds the client's copy of the session keys and credentials. The presented solution is applicable to mutual authentication protocols that are constructed as a combination of two unilateral authentications, including PEAP, EAP-TTLS and PIC.

In the following further examples we denote by K the session master key. In PEAP and EAP-TTLS the master key K is derived from the TLS master key T that is sent to the network access point (or access server), which uses K to derive the session keys for the wireless link. In PIC the key K is the key that is used to transport (e.g.) IKE credentials to the client terminal (C). The problem discovered above is due to the fact that in the prior proposed protocols K depends solely on the same secrets as the protection tunnel, and is therefore susceptible of being known to any peer at the end-point of the tunnel.

Further, let us denote by S some secrets derived by the C and the RAS (in the same role as AA above) in the stage two authentication protocol. The exact requirements for S are given later. Let T denote the master key that is used to derive the secret keys for the protection tunnel in the stage one protocol. Hence S is a secret shared by C and the RAS and T is a secret shared by C and AS (which is in the same role as back-end server above). For example, the TLS master key derived in the TLS handshake of PEAP is a typical example of T. In the previous solutions the secret S is not used (thereby allowing the man-in-the-middle attack). The master link key derived in EAP/SIM or EAP/AKA satisfies the requirements for S and can be used for this purpose. There are two ways of using S to achieve the necessary binding (or linking) between S and K. In the first method the binding is established directly by taking S as the input to the computation of session key K. The other two methods make use of a cryptographic check value to verify that the client C who is in possession of T is also in possession of S.

Method 1: After the remote authentication protocol between the C and the RAS is successfully completed the RAS sends the derived secret S to the AS (AKA authentication functionality) through a protected (Diameter) connection provided by the network infrastructure. The AS uses it, in addition to T, as input to the derivation of K. The client C knows S and T and performs identical computations to derive its copy of K.

Method 2: After the C and the AS have established the protection tunnel and the remote authentication protocol between the C and the RAS is successfully completed, the AS sends T to the RAS over a protected (e.g. Diameter) connection. The RAS computes a verification value V (a cryptographic check-sum) from T and S. The client C uses its values of T and S and the same check-sum computation method to compute its value of V. Then the C sends its value of V to the AS. The comparison of the two values of V is now performed by the AS or the RAS. If the values are compared by the AS, then the RAS sends its value of V to the AS. Another possibility is that the AS sends the value of V received from the C forward to the RAS, which performs the comparison. In this case the RAS needs to communicate the result of the comparison to the AS. If the values are equal, the AS derives K based on T. The client C uses its own copy of T to derive its session keys K.

Method 3: After the C and the AS have established the protection tunnel and the remote authentication protocol between the C and the RAS is successfully completed, the RAS sends S to the AS over a protected (e.g. Diameter) connection. The AS computes a verification value of V (cryptographic check-sum, e.g. TLS MAC) from T and S. The client C uses its values of T and S and the same check-sum computation method to compute its value of V. Then the C sends its value of V to the AS. The comparison of the two values of V is now performed by the AS. If the values are equal, the AS derives K based on T. The client C uses its own copy of T to derive its session keys K.

The three methods described above do not require any changes to the remote client authentication protocol. The support for the derivation of S can most naturally be added in the EAP encapsulation of the protocol in a similar way that current EAP encapsulations of existing authentication protocols provide methods for session key derivation. In Methods 1 and 3 the secret S is sent from the RAS to the AS using a protected channel, which depends on the trust relationships of the network infrastructure. Therefore the usage of S for remote authentication in protected mode must not endanger the original use of the remote authentication protocol. This is achieved if a one-way function is used to compute S from the original session keys.

Methods 2 and 3 do not require any changes to the methods by which the session key K is derived from T. Of these two methods, Method 3 may have some advantage over Method 2 due to the fact that the protection tunnel may provide check-value (TLS MAC or IPSec MAC) computation algorithms in the C and the AS.

Method 1 requires support for the usage of S as additional secret parameter in the derivation of the session key K. However, this is easy to achieve.

Further details of the protocols mentioned above are available as follows:

PIC: Y. Sheffer, H. Krawczyk, Bernard Aboba, PIC, A Pre-IKE Credential Provisioning Protocol; <draft-ietf-ipsra-pic-05.txt>11 Feb. 2002

PEAP: H. Andersson, S. Josefsson, Glen Zorn, Dan Simon, Ashwin Palekar, Protected EAP Protocol (PEAP); <draft-josefsson-pppext-eap-tls-eap-02.txt>23 Feb. 2002

TTLS: Paul Funk Simon Blake-Wilson, EAP Tunneled TLS Authentication Protocol (EAP-TTLS); <draft-ietf-pppext-eap-ttls-01.txt>February GETCERT: Bellovin, S., and Moskowitz, B., "Client Certificate and Key Retrieval for IKE", Internet draft (work in progress), draft-bellovin-ipsra-getcert-00.txt, June 2000.

The following abbreviations are used herein:
SIM=Subscriber Identity Module
AKA=Authentication and Key Agreement
OWLAN=Operator Wireless Local Area Network
PPP=Point-to-Point Protocol
IEEE=The Institute of Electrical and Electronics Engineers
USIM=Universal Subscriber Identity Module
IETF=Internet Engineering Task Force
PEAP=Protected EAP Protocol
TLS=Transport Layer Security
TTLS=Tunneled TLS
pppext="Point-to-Point protocol extensions" working group
PIC=A Pre-IKE Credential Provisioning Protocol
ISAKMP=Internet security association and key management protocol
AAA=authentication, authorization, and accounting
IPsec=Internet protocol security
RADIUS=Remote Authentication Dial In User Service
IKE=Internet key exchange
GETCERT=Internet draft "Client Certificate and Key Retrieval for IKE"
CPU=Central Processing Unit
HTTP=Hyper Text Transfer Protocol
ASIC=application-specific integrated circuit
GMM=GPRS Mobility Management
GPRS=General packet radio service
RAS=Remote Authentication Server
HSS=Home Subscriber Server
IMSI=International Mobile Subscriber Identity
AUTN=Authentication Token The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method, comprising:
executing a first authentication protocol, wherein a terminal authentication protocol comprises
authenticating an identity of a network entity by the terminal in a communication system;
sharing a key between the terminal and the network entity for use in securing subsequent communications between the terminal and the network entity; and
executing another authentication protocol comprising
sharing challenge data between the network entity and the terminal;
forming at the terminal test data by applying an authentication function to the challenge data;
sending a message comprising terminal authentication data, from the terminal to the network entity; and
determining, based on the terminal authentication data, whether to provide the terminal with access to a service, wherein the determining comprises providing the terminal with access to the service only when the terminal authentication data equals a predetermined function of at least the test data and the key; and forming at the terminal secret session keys by at least applying a predetermined function to the test data using the shared key established in the first authentication protocol, wherein the secret session keys are configured to secure the subsequent communications between the terminal and a network element.

2. A method as claimed in claim 1, further comprising:
forming the test data by applying the authentication function to the challenge data at an authentication functionality; and
sending the test data from the authentication functionality to the network entity,
wherein the determining comprises forming network authentication data by applying the predetermined function to the test data and the key at the network entity, and
wherein the determining further comprises providing the terminal with access to the service only when the terminal authentication data equals the network authentication data.

3. A method as claimed in claim 1, further comprising:
sending the key from the network entity to the authentication functionality;
forming the test data by applying the authentication function to the challenge data at the authentication functionality; and
forming network authentication data by applying the predetermined function to the test data and the key at the authentication functionality.

4. A method as claimed in claim 3, further comprising:
sending the terminal authentication data from the network entity to the authentication functionality; and
sending, from the authentication functionality to the network entity, an indication of whether the terminal authentication data equals the network authentication data,
wherein the determining comprises providing the terminal with access to the service only when the indication is that the terminal authentication data equals the network authentication data.

5. A method as claimed in claim 3, further comprising:
sending the network authentication data from the authentication functionality to the network entity,
wherein the determining comprises providing the terminal with access to the service only when the indication is that the terminal authentication data equals the network authentication data.

6. A method as claimed in claim 1, wherein the terminal authentication data is formed as a cryptographic checksum.

7. A method as claimed in claim 1, wherein the network entity is co-located with the authentication functionality.

8. A method as claimed in claim 1, wherein an identity module of the terminal is configured to perform the authentication function.

9. A method as claimed in claim 8, wherein the identity module is user-removable from the terminal.

10. A method as claimed in claim 8, wherein the identity module is a subscriber identity module or a universal subscriber identity module.

11. A method as claimed in claim 8, wherein the identity module is configured to store a code and the authentication function comprises a cryptographic transformation applied to the code and the input data.

12. A method as claimed in claim 1, wherein the authentication protocol is one of a pre-internet key exchange credential provisioning protocol, a protected extensible authentication protocol, or an extensible authentication protocol-tunneled transport layer security.

13. A method as claimed in claim 1, wherein the challenge data and the response data are formed according to an extensible authentication protocol.

14. A method as claimed in claim 1, wherein the said message is a dedicated authentication message.

15. A method as claimed in claim 1, wherein the predetermined function is used for derivation of a session key to be used for one of encryption or authentication of communications between the terminal and the network entity.

16. A method as claimed in claim 1, further comprising:
forming at the terminal secret session keys by at least applying a predetermined function to the test data using the shared key established in the another authentication protocol; and
forming at the network entity secret session keys by at least applying a predetermined function to the test data using the shared key established in the another authentication protocol,
wherein the secret session keys are configured to secure the subsequent communications between the terminal and a network element.

17. A method as claimed in claim 1, further comprising:
executing a third authentication protocol for authentication of the terminal comprising:
sharing between an authentication functionality and the challenge data;
forming response data and another key at the terminal by applying the authentication function to the challenge data;
sending the response data to the authentication functionality from the terminal;
authenticating the terminal at the authentication functionality using the response data; and
applying the authentication function to the challenge data to duplicate the another key.

18. A method as claimed in claim 17, wherein the third authentication protocol is an authentication and key agreement protocol or any protocol of the extensible authentication protocol family.

19. A method as claimed in claim 18, wherein the test data comprises one or both of an authentication and key agreement protocol integrity key value or an authentication and key agreement protocol cipher key value.

20. A system, comprising:
a terminal configured to apply authentication functions to input data to form response data; and
a network entity configured to provide access to a service, wherein the system is configured to perform an authentication method of executing an authentication protocol, wherein the authentication protocol comprises
authenticating an identity of the network entity by the terminal in the system;
sharing a key between the terminal and the network entity for use in securing subsequent communications between the terminal and the network entity; and
executing another authentication protocol comprising
sharing challenge data between the network entity and the terminal;
forming at the terminal test data by applying an authentication function to the challenge data;
sending a message comprising terminal authentication data from the terminal to the network entity; and determining, based on the terminal authentication data, whether to provide the terminal with access to a service;

wherein the determining comprises providing the terminal with access to the service only when the terminal authentication data equals a predetermined function of at least the test data and the key; and forming at the terminal secret session keys by at least applying a predetermined function to the test data using the shared key established in the first authentication protocol, wherein the secret session keys are configured to secure the subsequent communications between the terminal and a network element.

21. A system as claimed in claim 20, wherein the system is further configured to execute a linking protocol by forming at the terminal secret session keys by at least applying a predetermined function to the test data using the shared key established in the another authentication protocol, and forming at the network entity secret session keys by at least applying a predetermined function to the test data using the shared key established in the another authentication protocol, wherein the secret session keys are configured to secure the subsequent communications between the terminal and some network element.

22. A method, comprising:

executing an authentication protocol, wherein the authentication protocol comprises authenticating an identity of a network entity by a terminal in a communication system, and sharing a key between the terminal and the network entity for use in securing subsequent communications between the terminal and the network entity; and executing another authentication protocol comprising receiving challenge data from the network entity at the terminal;

forming at the terminal test data by applying an authentication function to the challenge data;

sending a message comprising terminal authentication data from the terminal to the network entity; and receiving access to a service at the terminal following a determination of whether the terminal authentication data equals a predetermined function of at least the test data and the key; and forming at the terminal secret session keys by at least applying a predetermined function to the test data using the shared key established in the first authentication protocol, wherein the secret session keys are configured to secure the subsequent communications between the terminal and a network element.

23. A method as claimed in claim 22, wherein the terminal authentication data is formed as a cryptographic checksum.

24. A method as claimed in claim 22, wherein the network entity is co-located with an authentication functionality.

25. A method as claimed in claim 22, wherein an identity module of the terminal is configured to perform the authentication function.

26. A method as claimed in claim 25, wherein the identity module is user-removable from the terminal.

27. A method as claimed in claim 25, wherein the identity module is a subscriber identity module or a universal subscriber identity module.

28. A method as claimed in claim 25, wherein the identity module is configured to store a code and the authentication function comprises a cryptographic transformation applied to the code and the input data.

29. A method as claimed in claim 22, wherein the authentication protocol is one of a pre-internet key exchange credential provisioning protocol, a protected extensible authentication protocol or an extensible authentication protocol-tunneled transport layer security.

30. A method as claimed in claim 22, wherein the challenge data and the response data are formed according to an extensible authentication protocol.

31. A method as claimed in claim 22, wherein the message is a dedicated authentication message.

32. A method, comprising:

executing an authentication protocol, wherein the authentication protocol comprises sending an identity of a network entity for authentication by a terminal in a communication system;

sharing a key between the terminal and the network entity for use in securing subsequent communications between the terminal and the network entity; and executing another authentication protocol comprising sending challenge data from the network entity to the terminal for forming test data at the terminal by applying an authentication function to the challenge data;

receiving a message comprising terminal authentication data from the terminal at the network entity;

determining, based on the terminal authentication data, whether to provide the terminal with access to a service;

providing the terminal with access to the service only when the terminal authentication data equals a predetermined function of at least the test data and the key; and forming secret session keys by at least applying a predetermined function to the test data using the shared key established in the first authentication protocol, wherein the secret session keys are configured to secure the subsequent communications between the terminal and a network element.

33. A method as claimed in claim 32, wherein the terminal authentication data is formed as a cryptographic checksum.

34. A method as claimed in claim 32, wherein the network entity is co-located with an authentication functionality.

35. A method as claimed in claim 32, wherein an identity module of the terminal is configured to perform the authentication function.

36. A method as claimed in claim 35, wherein the identity module is user-removable from the terminal.

37. A method as claimed in claim 35, wherein the identity module is a subscriber identity module or a universal subscriber identity module.

38. A method as claimed in claim 35, wherein the identity module is configured to store a code and the authentication function comprises a cryptographic transformation applied to the code and the input data.

39. A method as claimed in claim 32, wherein the authentication protocol is one of a pre-internet key exchange credential provisioning protocol, a protected extensible authentication protocol or an extensible authentication protocol-tunneled transport layer security.

40. A method as claimed in claim 32, wherein the challenge data and the response data are formed according to an extensible authentication protocol.

41. A method as claimed in claim 32, wherein the message is a dedicated authentication message.

42. A method as claimed in claim 32, wherein the predetermined function is used for derivation of a session key to be used for one of encryption or authentication of the subsequent communications between the terminal and the network entity.

43. An apparatus, comprising:
a processor configured to apply an authentication function to input data to form response data, and to execute an authentication protocol,
wherein the authentication protocol comprises
authenticating an identity of a network entity by a terminal in a communication system, and
sharing a key between the terminal and the network entity for use in securing subsequent communications between the terminal and the network entity;
wherein the processor is further configured to execute another authentication protocol comprising
receiving challenge data from the network entity at the terminal;
forming at the terminal test data by applying an authentication function to the challenge data;
sending a message comprising terminal authentication data from the terminal to the network entity;
receiving access to a service at the terminal following a determination of whether the terminal authentication data equals a predetermined function of at least the test data and the key; and
forming at the terminal secret session keys by at least applying a predetermined function to the test data using the shared key established in the first authentication protocol, wherein the secret session keys are configured to secure the subsequent communications between the terminal and a network element.

44. An apparatus as claimed in claim 43, wherein the terminal authentication data is formed as a cryptographic checksum.

45. An apparatus as claimed in claim 43, wherein the network entity is co-located with an authentication functionality.

46. An apparatus as claimed in claim 43, wherein an identity module of the terminal is configured to perform the authentication function.

47. An apparatus as claimed in claim 46, wherein the identity module is user-removable from the terminal.

48. An apparatus as claimed in claim 46, wherein the identity module is a subscriber identity module or a universal subscriber identity module.

49. An apparatus as claimed in claim 46, wherein the identity module is configured to store a code and the authentication function comprises a cryptographic transformation applied to the code and the input data.

50. An apparatus as claimed in claim 43, wherein the authentication protocol is one of a pre-internet key exchange credential provisioning protocol, a protected extensible authentication protocol or an extensible authentication protocol-tunneled transport layer security.

51. An apparatus as claimed in claim 43, wherein the challenge data and the response data are formed according to an extensible authentication protocol.

52. An apparatus as claimed in claim 43, wherein the message is a dedicated authentication message.

53. An apparatus, comprising:
a processor configured to execute an authentication protocol, wherein the authentication protocol comprises
sending an identity of a network entity for authentication by a terminal in a communication system; and
sharing a key between the terminal and the network entity for use in securing subsequent communications between the terminal and the network entity;
wherein the processor is further configured to execute another authentication protocol comprising
sending challenge data from the network entity to the terminal for forming test data at the terminal by applying an authentication function to the challenge data;
receiving a message comprising terminal authentication data, from the terminal at the network entity;
determining, based on the terminal authentication data, whether to provide the terminal with access to a service;
providing the terminal with access to the service only when the terminal authentication data equals a predetermined function of at least the test data and the key; and
forming secret session keys by at least applying a predetermined function to the test data using the shared key established in the first authentication protocol, wherein the secret session keys are configured to secure the subsequent communications between the terminal and a network element.

54. An apparatus as claimed in claim 53, wherein the terminal authentication data is formed as a cryptographic checksum.

55. An apparatus as claimed in claim 53, wherein the network entity is co-located with an authentication functionality.

56. An apparatus as claimed in claim 53, wherein an identity module of the terminal is configured to perform the authentication function.

57. An apparatus as claimed in claim 56, wherein the identity module is user-removable from the terminal.

58. An apparatus as claimed in claim 56, wherein the identity module is a subscriber identity module or a universal subscriber identity module.

59. An apparatus as claimed in claim 56, wherein the identity module is configured to store a code and the authentication function comprises a cryptographic transformation applied to the code and the input data.

60. An apparatus as claimed in claim 53, wherein the authentication protocol is one of a pre-internet key exchange credential provisioning protocol, a protected extensible authentication protocol or an extensible authentication protocol-tunneled transport layer security.

61. An apparatus as claimed in claim 53, wherein the challenge data and the response data are formed according to an extensible authentication protocol.

62. An apparatus as claimed in claim 53, wherein the message is a dedicated authentication message.

63. A computer program product embodied on a computer readable storage medium, the computer program product being configured to control a processor to perform a method comprising:
executing an authentication protocol, wherein the terminal authentication protocol comprises
authenticating an identity of a network entity by a terminal in a communication system;
sharing a key between the terminal and the network entity for use in securing subsequent communications between the terminal and the network entity; and
executing another authentication protocol comprising
sharing challenge data between the network entity and the terminal,
forming at the terminal test data by applying an authentication function to the challenge data;
sending a message comprising terminal authentication data, from the terminal to the network entity; and
determining, based on the terminal authentication data, whether to provide the terminal with access to a service, wherein the determining comprises providing the terminal with access to the service only when the terminal authentication data equals a predetermined function of at least the test data and the key; and forming at the terminal secret session keys by at least applying a predetermined function to the test data using the shared key established in the first authentication protocol, wherein the secret session keys are configured to secure the subsequent communications between the terminal and a network element.

64. A computer program product embodied on a computer readable storage medium, the computer program product being configured to control a processor to perform a process comprising:

executing an authentication protocol, wherein the authentication protocol comprises authenticating an identity of a network entity by a terminal in a communication system, and sharing a key between the terminal and the network entity for use in securing subsequent communications between the terminal and the network entity; and executing another authentication protocol comprising receiving challenge data from the network entity at the terminal;

forming at the terminal test data by applying an authentication function to the challenge data;

sending a message comprising terminal authentication data from the terminal to the network entity;

receiving access to a service at the terminal following a determination of whether the terminal authentication data equals a predetermined function of at least the test data and the session key; and forming a secret key by at least applying a predetermined function to the test data using the session key, the session key binding the authentication protocol and the another authentication protocol.

65. A computer program product embodied on a computer readable storage medium, the computer program product being configured to control a processor to perform a method comprising:

executing an authentication protocol, wherein the authentication protocol comprises sending an identity of a network entity for authentication by a terminal in a communication system;

sharing a key between the terminal and the network entity for use in securing subsequent communications between the terminal and the network entity; and executing another authentication protocol comprising sending challenge data from the network entity to the terminal for forming test data at the terminal by applying an authentication function to the challenge data;

receiving a message comprising terminal authentication data from the terminal at the network entity;

determining, based on the terminal authentication data, whether to provide the terminal with access to a service;

providing the terminal with access to the service only when the terminal authentication data equals a predetermined function of at least the test data and the key; and forming secret session keys by at least applying a predetermined function to the test data using the shared key established in the first authentication protocol, wherein the secret session keys are configured to secure the subsequent communications between the terminal and a network element.

* * * * *

UNITED STATES PATENT AND TRADEMARK OFFICE
CERTIFICATE OF CORRECTION

PATENT NO. : 7,707,412 B2  
APPLICATION NO. : 10/528161  
DATED : April 27, 2010  
INVENTOR(S) : Kaisa Nyberg et al.

It is certified that error appears in the above-identified patent and that said Letters Patent is hereby corrected as shown below:

In claim 20, at lines 54 and 55 of column 16:

"method of executing an authentication protocol, wherein the authentication protocol comprise" should instead read -- method of executing a first authentication protocol, wherein the first authentication protocol comprises --

In claim 22, at lines 26 and 27 of column 17:

"executing an authentication protocol, wherein the authentication protocol comprises" should instead read -- executing a first authentication protocol, wherein the first authentication protocol comprises --

In claim 29, at lines 66 and 67 of column 17:

"wherein the authentication protocol" should instead read -- wherein the first authentication protocol --

In claim 32, at lines 10 and 11 of column 18:

"executing an authentication protocol, wherein the authentication protocol comprises" should instead read -- executing a first authentication protocol, wherein the first authentication protocol comprises --

In claim 39, lines 54 and 55 of column 18:

"wherein the authentication protocol" should instead read -- wherein the first authentication protocol --

In claim 43, at lines 3 and 5 of column 19:

"to execute an authentication protocol, wherein the authentication protocol comprises" should instead read -- to execute a first authentication protocol, wherein the first authentication protocol comprises --

Signed and Sealed this

Twenty-first Day of September, 2010

David J. Kappos  
*Director of the United States Patent and Trademark Office*

CERTIFICATE OF CORRECTION (continued)
U.S. Pat. No. 7,707,412 B2

In claim 50, at lines 47 and 48 of column 19:

"wherein the authentication protocol" should instead read -- wherein the first authentication protocol --

In claim 53, at lines 58 and 59 of column 19:

"to execute an authentication protocol, wherein the authentication protocol comprises" should instead read -- to execute a first authentication protocol, wherein the first authentication protocol comprises --

In claim 60, at lines 35 and 36 of column 20:

"the authentication protocol" should instead read -- the first authentication protocol --

In claim 63, at line 50 of column 20:

"executing an authentication protocol, wherein the terminal" should instead read -- executing a first authentication protocol, wherein a terminal --

In claim 64, at lines 16 and 17 of column 21:

"executing an authentication protocol, wherein the authentication protocol comprises" should instead read -- executing a first authentication protocol, wherein the first authentication protocol comprises --

In claim 65, at lines 9 and 10 of column 22:

"executing an authentication protocol, wherein the authentication protocol comprises" should instead read -- executing a first authentication protocol, wherein the first authentication protocol comprises --